US012587499B2

(12) United States Patent
Tian et al.

(10) Patent No.: US 12,587,499 B2

(45) Date of Patent: Mar. 24, 2026

(54) HIGH-AVAILABILITY EGRESS ACCESS WITH CONSISTENT SOURCE IP ADDRESSES FOR WORKLOADS

(71) Applicant: VMware, Inc., Palo Alto, CA (US)

(72) Inventors: Quan Tian, Beijing (CN); Jianjun Shen, Redwood City, CA (US); Donghai Han, Beijing (CN); Shuyang Xin, Shanghai (CN); Wenqi Qiu, Beijing (CN)

(73) Assignee: VMware, Inc., Palo Alto, CA (US)

( * ) Notice: Subject to any disclaimer, the term of this patent is extended or adjusted under 35 U.S.C. 154(b) by 427 days.

(21) Appl. No.: 18/212,674

(22) Filed: Jun. 21, 2023

(65) Prior Publication Data

US 2024/0388559 A1    Nov. 21, 2024

(51) Int. Cl.
  *H04L 61/103*     (2022.01)
  *H04L 9/40*      (2022.01)
  *H04L 45/02*     (2022.01)

(52) U.S. Cl.
  CPC ............ *H04L 61/103* (2013.01); *H04L 45/04* (2013.01); *H04L 63/0236* (2013.01)

(58) Field of Classification Search
  CPC .................................................... H04L 61/103
  USPC ........................................................ 370/392
  See application file for complete search history.

(56) References Cited

U.S. PATENT DOCUMENTS

| | | | |
|---|---|---|---|
| 2011/0182289 A1* | 7/2011 | Raman | H04W 40/02 370/356 |
| 2021/0266259 A1 | 8/2021 | Renner, III et al. | |
| 2022/0029917 A1 | 1/2022 | Masnauskas et al. | |
| 2024/0388523 A1 | 11/2024 | Tian et al. | |

FOREIGN PATENT DOCUMENTS

| | | | | |
|---|---|---|---|---|
| CN | 118435581 A | * | 8/2024 | H04L 67/288 |

OTHER PUBLICATIONS

A Guide to the Kubernetes Networking Model. Kevin Sookocheff Jul. 11, 2018 (Year: 2018).*
Extended European Search Report, European Application No. 24174619.7 dated Oct. 9, 2024, 11 pages.
Sookocheff, Kevin: "A Guide to the Kubernetes Networking Model", Jul. 11, 2018, pp. 1-29, XP093065536, Retrieved from the Internet: URL: https://sookocheff.com/post/kubernetes/understanding-kubernetes-networking, 29 pages.

* cited by examiner

*Primary Examiner* — Sibte H Bukhari
(74) *Attorney, Agent, or Firm* — King Intellectual Asset Management

(57) ABSTRACT

Systems and methods for configuring an egress node for an egress pod set comprising one or more pods are provided. The egress pod set may be allocated one or more egress internet protocol (IP) addresses. The egress node may be selected among nodes of a cluster including the one or more pods. The egress node may be configured as the routing destination for an egress IP address selected among the one or more egress internet protocol (IP) addresses.

20 Claims, 6 Drawing Sheets

400

Begin

SELECT EGRESS NODE FOR EGRESS POD SET ～ 402

DETERMINE ACTIVE EGRESS IP ADDRESS AMONG MULTIPLE EGRESS IP
ADDRESSES BASED ON SELECTED EGRESS POD SET ～ 404

CONFIGURE EGRESS NODE TO RECEIVE PACKETS WITH DESTINATION IP
ADDRESS SET TO ACTIVE EGRESS IP ADDRESS ～ 406

End

600

Begin

SELECT EGRESS NODE FOR EGRESS POD SET        602

CONFIGURE EGRESS NODE TO RECEIVE PACKETS WITH DESTINATION IP
ADDRESS SET TO ACTIVE EGRESS IP ADDRESS        604

End

HIGH-AVAILABILITY EGRESS ACCESS WITH CONSISTENT SOURCE IP ADDRESSES FOR WORKLOADS

CLAIM OF PRIORITY

This application claims priority to International Application Number PCT/CN2023/094437, entitled "High-Availability Egress Access with Consistent Source IP Addresses for Workloads", filed on May 16, 2023. The disclosure of this application is hereby incorporated by reference.

BACKGROUND

Software defined networking (SDN) involves a plurality of hosts in communication over a physical network infrastructure of a data center (e.g., an on-premise data center or a cloud data center). The physical network to which the plurality of physical hosts are connected may be referred to as an underlay network. Each host has one or more virtualized endpoints such as virtual machines (VMs), containers, Docker containers, data compute nodes, isolated user space instances, namespace containers, and/or other virtual computing instances (VCIs), that are connected to, and may communicate over, logical overlay networks. For example, the VMs and/or containers running on the hosts may communicate with each other using an overlay network established by hosts using a tunneling protocol.

A container is a package that relies on virtual isolation to deploy and run applications that access a shared operating system (OS) kernel. Containerized applications, also referred to as containerized workloads or "workloads," can include a collection of one or more related applications packaged into one or more groups of containers, referred to as pods. Containerized workloads run on a container orchestration platform that enables the automation of much of the operational effort required to run containers having workloads and services. This operational effort includes a wide range of things needed to manage a container's lifecycle, including, but not limited to, provisioning, deployment, scaling (up and down), networking, and load balancing.

Kubernetes® (K8S®) software is an example open-source container orchestration platform that automates the deployment and operation of such containerized workloads. In particular, Kubernetes may be used to create a cluster of interconnected nodes, including (1) one or more worker nodes that run the containerized workloads (e.g., in a worker plane) and (2) one or more control plane nodes (e.g., in a control plane) having control plane components running thereon that control the cluster. Control plane components make global decisions about the cluster (e.g., scheduling), and can detect and respond to cluster events (e.g., starting up a new pod when a workload deployment's intended replication is unsatisfied). As used herein, a node may be a physical machine, or a VM configured to run on a physical machine running a hypervisor.

As part of an SDN, any arbitrary set of VCIs in a datacenter may be placed in communication across a logical Layer 2 (L2) overlay network by connecting them to a logical switch. A logical switch is an abstraction of a physical switch that is collectively implemented by a set of virtual switches on each node (e.g., host machine or VM) that has a VCI connected to the logical switch. The virtual switch on each node operates as a managed edge switch implemented in software by a hypervisor or OS on each node. Virtual switches provide packet forwarding and networking capabilities to VCIs running on the node. In particular, each virtual switch uses hardware based switching techniques to connect and transmit data between VCIs on a same node, or different nodes.

Further, in some cases, one or more applications packaged into one or more groups of containers may be deployed on a single VM or a physical machine. From a network standpoint, containers within a pod share a same network namespace, meaning they share the same internet protocol (IP) address or IP addresses associated with the pod.

A network plugin, such as a container networking interface (CNI) plugin, may be used to create virtual network interface(s) usable by the pods for communicating on respective logical networks of the SDN infrastructure in a data center. In particular, the network plugin may be a runtime executable that configures a network interface, referred to as a pod interface, into a container network namespace. The network plugin is further configured to assign a network address (e.g., an IP address) to each created network interface (e.g., for each pod) and may also add routes relevant for the interface. Pods within a cluster can communicate with each other using their respective IP addresses. For example, packets sent from a source pod to a destination pod may include a source IP address of the source pod and a destination IP address of the destination pod, so that the packets are appropriately routed over a network from the source pod to the destination pod.

Communication between pods of a node may be accomplished via use of virtual switches implemented in nodes. Each virtual switch may include one or more virtual ports (Vports) that provide logical connection points between pods. For example, a pod interface of a first pod and a pod interface of a second pod may connect to Vport(s) provided by the virtual switch(es) of their respective nodes to allow for communication between the first and second pods. In this context "connect to" refers to the capability of conveying network traffic, such as individual network packets, or packet descriptors, pointers, identifiers, etc., between components so as to effectuate a virtual data path between software components.

Though pods within a cluster can communicate with each other using their respective IP addresses, the IP addresses of pods are not necessarily routable outside the cluster. Accordingly, source network address translation (SNAT) may be performed for egress packets sent from pods within a cluster to destinations outside the cluster. In particular, an egress packet sent from a pod within the cluster may include as a source IP address the IP address (e.g., 10.1.1.2) of the pod that is routable within the cluster, such IP address being referred to as an internal IP address of the pod based on internal IP addresses only being routable within the cluster. SNAT may be performed on the egress packet, such as at a node (referred to as an egress node) acting as an egress gateway for the pod for communication outside the cluster. SNAT translates the internal IP address to an egress IP address (e.g., 192.168.1.1), where the egress IP address is routable outside of the cluster. Accordingly, the source IP address in the packet is changed from the internal IP address to the egress IP address.

The egress IP address may be an IP address of the node on which the pod is running. Accordingly, for all pods running on the same node, SNAT of the internal IP address of each pod (each pod having a different internal IP address) will cause translation to the same egress IP address. Further, where multiple instances (e.g., replicas) of a given pod (an instance of a pod also being referred to as a pod instance), such as corresponding to a particular application/workload, are running on different nodes, SNAT of the internal IP addresses of pod instances running on different nodes will cause translation to different egress IP addresses. While such SNAT allows for pods to make external connections to destinations outside the cluster, the translation may cause difficulties for firewalls or applications that use the source IP address to identify client applications.

For example, since pods for different applications running on the same node are associated with the same egress IP address, then all egress packets outside of the cluster from the different applications would have the same source IP address. Accordingly, if a firewall policy is applied by a firewall outside the cluster to such egress packets based on the source IP address within the egress packets headers, the same policy may be applied to all the egress packets, even though they are associated with different applications. Therefore, it may not be feasible to assign different firewall policies to different applications, which is not desirable.

As another example, since multiple pod instances for the same application/workload running on different nodes are associated with the different egress IP addresses, then different egress packets outside of the cluster from the same application/workload may have different source IP addresses. Accordingly, to apply a firewall policy to all egress packets associated with the same application/workload based on the source IP address, it may be necessary to apply the firewall policy to each different egress IP address. Further, as pods may move between nodes, the egress IP address of the pods would accordingly change. Therefore, the firewall policy may continually need to be updated with the changing egress IP addresses, which may not be feasible or desirable.

SUMMARY

One embodiment includes a method for configuring an egress node for an egress pod set comprising one or more pods. The method includes selecting a node of a cluster of nodes to act as the egress node for the egress pod set, wherein the egress pod set is allocated a plurality of egress internet protocol (IP) addresses. The method further includes determining an egress IP address of the plurality of egress IP addresses to be an active egress IP address of the egress pod set based on an IP address of the egress node. The method further includes configuring the egress node to receive packets with a destination IP address set to the active egress IP address.

Another embodiment includes a method for configuring an egress node for an egress pod set comprising one or more pods. The method includes selecting a node of a cluster of nodes to act as the egress node for the egress pod set, wherein the egress pod set is allocated a single egress internet protocol (IP) address, and wherein the single egress IP address is outside a classless inter-domain routing (CIDR) block of a subnet of the egress node. The method further includes configuring a router with a static route to associate the egress node with the single egress IP address.

Further embodiments include one or more non-transitory computer-readable storage media storing instructions that, when executed by one or more processors, cause the one or more processors to perform one or more of the one or more methods set forth above, and a computer system including at least one processor and at least one memory configured to carry out one or more of the one or more methods set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
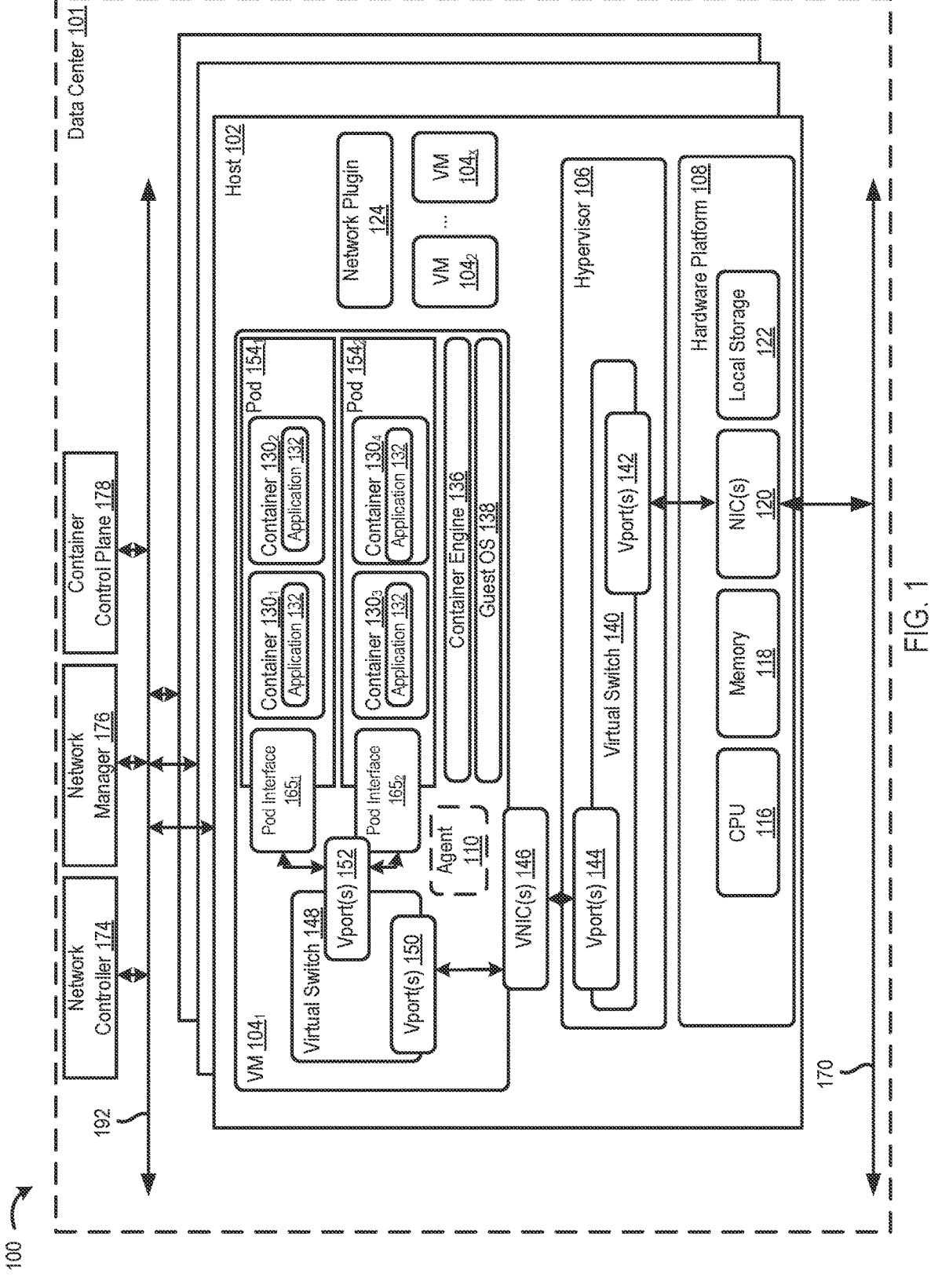
FIG. 1 depicts example physical and virtual network components in a networking environment in which embodiments of the present disclosure may be implemented.

Certain embodiments herein provide techniques for allocating egress IP addresses to workloads (e.g., pods).

In certain embodiments, a set of multiple egress IP addresses is uniquely allocated to one or more pods, the one or more pods referred to herein as an egress pod set. In certain embodiments, where there are multiple pods in an egress pod set, the multiple pods may share some characteristic, such as being in the same namespace, being replica pods (e.g., for the same application), being associated with a particular label, and/or the like. Where there are multiple pods in an egress pod set, the multiple pods do not necessarily run on the same node, and may run on different nodes.

Different sets of multiple egress IP addresses are allocated to different egress pod sets. For example, egress IP addresses 192.168.0.200, 192.168.1.200, and 192.168.2.200 may be allocated to a first egress pod set, and egress IP addresses 192.168.0.201, 192.168.1.201, and 192.168.2.201 may be allocated to a second egress pod set. Accordingly, in some embodiments, no egress IP address is allocated to more than one egress pod set at any given time.

Accordingly, based on uniquely allocating egress IP addresses to an egress pod set, egress packets from different egress pod sets will have different egress IP addresses after performing SNAT. Accordingly, components, such as firewalls and applications, are able to use the source IP address to differentiate between egress packets from different egress pod sets. For example, assume a first pod for a first application is running on a first node, and a second pod for a second application is running on the first node. Further, assume the first pod is part of a first egress pod set, and the second pod is part of a second egress pod set. Accordingly, even though the first and second pods are running on the same first node, they will have different egress IP addresses allowing egress packets from the first and second pods to be differentiated based on source IP address.

As another example, assume a first pod for a first application is running on a first node, and a second pod for the first application is running on a second node. Further, assume the first pod and the second pod are part of the same egress pod set. Accordingly, even though the first and second pods associated with the same first application are running on different nodes, they will have the same egress IP address. Therefore, the single egress IP address can be used to identify the first application, even though there are different pods and nodes associated with the first application.

Further, in some embodiments, each egress IP address of a set of multiple egress IP addresses may belong to a different subnet. A subnet, or subnetwork, is a logical partition of an internet protocol (IP) network. In certain aspects, nodes that belong to the subnet are assigned IP addresses from a given classless inter-domain routing (CIDR) block associated with the subnet. The IP addresses may be IP addresses of a physical network to which the nodes are coupled, or of a logical network to which the nodes are coupled. The nodes of a given subnet may share the same connectivity, security, and availability requirements.

Accordingly, each egress pod set may be allocated egress IP addresses for multiple subnets. In certain embodiments, only one of the multiple egress IP addresses is used as the active egress IP address for the egress pod set at any given time. The egress IP address needs to be routable within the subnet in which the egress node for the egress pod set is located. Therefore, in some cases, the IP address of the egress node for the egress pod set needs to be in the same subnet as the egress IP address of the egress pod set. By allocating egress IP addresses in multiple subnets to the egress pod set, the egress node for the egress pod set can be in any of the multiple subnets. In particular, not all nodes of a cluster may be in the same subnet, and instead the nodes of a cluster may be spread across multiple subnets. Accordingly, the selection of the egress node for the egress pod set can be load balanced across nodes across multiple subnets, therefore providing high availability even if all nodes of a given subnet fail.

In some embodiments, each egress pod set is associated with a single egress IP address. In some embodiments, a node may be selected to act as the egress node for the egress pod set, even though the node has an IP address in a different subnet than the egress IP address of the egress pod set. In particular, a static route to the egress IP address may be configured at a router that routes traffic for the subnet of the egress node. Accordingly, the egress IP address becomes routable within the subnet of the egress node. Thus, the selection of the egress node for the egress pod set can be load balanced across nodes across multiple subnets, therefore providing high availability even if all nodes of a given subnet fail.

FIG. 1 depicts example physical and virtual network components in a networking environment 100 in which embodiments of the present disclosure may be implemented.

Networking environment 100 includes a data center 101. Data center 101 includes one or more hosts 102, a management network 192, a data network 170, a network controller 174, a network manager 176, and a container control plane 178. Data network 170 and management network 192 may be implemented as separate physical networks or as separate virtual local area networks (VLANs) on the same physical network.

Host(s) 102 may be communicatively connected to data network 170 and management network 192. Data network 170 and management network 192 are also referred to as physical or "underlay" networks, and may be separate physical networks or the same physical network as discussed. As used herein, the term "underlay" may be synonymous with "physical" and refers to physical components of networking environment 100. As used herein, the term "overlay" may be used synonymously with "logical" and refers to the logical network implemented at least partially within networking environment 100.

Host(s) 102 may be geographically co-located servers on the same rack or on different racks in any arbitrary location in the data center. Host(s) 102 may be configured to provide a virtualization layer, also referred to as a hypervisor 106, that abstracts processor, memory, storage, and networking resources of a hardware platform into multiple VMs $104_1$-$104_x$ (collectively referred to herein as "VMs 104" and individually referred to herein as "VM 104").

Host(s) 102 may be constructed on a server grade hardware platform 108, such as an x86 architecture platform. Hardware platform 108 of a host 102 may include components of a computing device such as one or more processors (CPUs) 116, system memory 118, one or more network interfaces (e.g., physical network interface cards (PNICs) 120), storage 122, and other components (not shown). A CPU 116 is configured to execute instructions, for example, executable instructions that perform one or more operations described herein and that may be stored in the memory and storage system. The network interface(s) enable host 102 to communicate with other devices via a physical network, such as management network 192 and data network 170.

In certain embodiments, hypervisor 106 implements one or more logical switches as a virtual switch 140. A virtual switch 140 may be a virtual distributed switch (VDS). In this case, each host 102 may implement a separate virtual switch corresponding to the VDS, but the virtual switches 140 at each host 102 may be managed like a single virtual distributed switch (not shown) across the hosts 102.

Each of VMs 104 running on host 102 may include virtual interfaces, often referred to as virtual network interface cards (VNICs), such as VNICs 146, which are responsible for exchanging packets between VMs 104 and hypervisor 106. VNICs 146 can connect to Vports 144, provided by virtual switch 140. Virtual switch 140 also has Vport(s) 142 connected to PNIC(s) 120, such as to allow VMs 104 to communicate with virtual or physical computing devices outside of host 102 via data network 170 and/or management network 192.

Each VM 104 may also implement a virtual switch 148 for forwarding ingress packets to various entities running within the VM 104. Such virtual switch 148 may run on a guest OS 138 of the VM 104, instead of being implemented by a hypervisor, and may be programmed, for example, by agent 110 running on guest OS 138 of the VM 104. For example, the various entities running within each VM 104 may include pods 154 including containers 130. Depending on the embodiment, the virtual switch 148 may be configured with Open vSwitch (OVS), which is an open source project to implement virtual switches to enable network automation, while still supporting standard management interfaces and protocols. Though not shown in FIG. 1, in cases where pods 154 are running on an OS of host 102, instead of on guest OS 138 of a VM 104, the virtual switch 148 may run on the OS of host 102.

In particular, each VM 104 implements a virtual hardware platform that supports the installation of a guest OS 138, which is capable of executing one or more applications. Guest OS 138 may be a standard, commodity operating system. Examples of a guest OS include Microsoft Windows, Linux, and/or the like.

Each VM 104 may include a container engine 136 installed therein and running as a guest application under control of guest OS 138. Container engine 136 is a process that enables the deployment and management of virtual instances (referred to interchangeably herein as "containers") by providing a layer of OS-level virtualization on guest OS 138 within VM 104, or an OS of host 102. Containers 130 are software instances that enable virtualization at the OS level. That is, with containerization, the kernel of guest OS 138, or an OS of host 102 if the containers are directly deployed on the OS of host 102, is configured to provide multiple isolated user space instances, referred to as containers. Containers 130 appear as unique servers from the standpoint of an end user that communicates with each of containers 130. However, from the standpoint of the OS on which the containers execute, the containers are user processes that are scheduled and dispatched by the OS. Though not shown in FIG. 1, in cases where pods 154 are running on an OS of host 102, instead of on guest OS 138 of a VM 104, the container engine 136 may run on the OS of host 102.

Containers 130 encapsulate an application, such as application 132 as a single executable package of software that bundles application code together with all of the related configuration files, libraries, and dependencies required for it to run. Application 132 may be any software program, such as a word processing program or a gaming server.

In certain embodiments, data center 101 includes a container control plane 178. Container control plane 178 is an orchestration control plane, such as Kubernetes®, to deploy and manage applications and/or services thereof on nodes (e.g., hosts 102 or VMs 104), of a node cluster, using containers 130. For example, Kubernetes may deploy containerized applications as containers 130 and control plane 178 on a cluster of nodes. The control plane 178 for each cluster of nodes, manages the computation, storage, and memory resources to run containers 130. Further, the control plane may support the deployment and management of applications (or services) on the cluster using containers 130. In some cases, the control plane deploys applications as pods 154 of containers 130 running on hosts 102, either within VMs or directly on an OS of the host (not shown). Other types of container-based clusters based on container technology, such as Docker® clusters, may also be considered. Though certain embodiments are discussed with pods 154 running in a VM as a node, and container engine 136, agent 110, and virtual switch 148 running on guest OS 138 of VM 104, the techniques discussed herein are also applicable to pods 154 running directly on an OS of host 102 as a node. For example, host 102 may not include hypervisor 106, and may instead include a standard operating system. Further, virtual switch 140, agent 110, and container engine 136 may then run on the OS of host 102.

In order for packets to be forwarded to and received by pods 154 and their containers 130, each of the pods 154 may be set-up with a network interface, such as a pod interface 165. The pod interface 165 is associated with one or more IP addresses, such that the pod 154, and each container 130 within the pod 154, is addressable by the one or more IP addresses. Accordingly, after each pod 154 is created, network plugin 124 is configured to set up networking for the newly created pod 154 enabling the new containers 130 of the pod 154 to send and receive traffic. As shown, pod interface 165₁ is configured for and attached to a pod 154₁. Other pod interfaces, such as pod interface 165₂, may be configured for and attached to different, existing pods 154.

The network plugin 124 may include a set of modules that execute on each node to provide networking and security functionality for the pods. In addition, an agent 110 may execute on each node (i) to configure the forwarding element and (ii) to handle troubleshooting requests.

Additional details of the network plugin 124 and associated functionality is disclosed in U.S. application Ser. No. 17/006,846, filed on Aug. 30, 2022, and titled "CONNECTION TRACKING FOR CONTAINER CLUSTER," which is hereby incorporated by reference herein in its entirety.

Data center 101 includes a network management plane and a network control plane. The management plane and control plane each may be implemented as single entities (e.g., applications running on a physical or virtual compute instance), or as distributed or clustered applications or components. In alternative embodiments, a combined manager/controller application, server cluster, or distributed application, may implement both management and control functions. In the embodiment shown, network manager 176 at least in part implements the network management plane and network controller 174 at least in part implements the network control plane.

The network control plane is a component of software defined network (SDN) infrastructure and determines the logical overlay network topology and maintains information about network entities such as logical switches, logical routers, endpoints, etc. The logical topology information is translated by the control plane into physical network configuration data that is then communicated to network elements of host(s) 102. Network controller 174 generally represents a network control plane that implements software defined networks, e.g., logical overlay networks, within data center 101. Network controller 174 may be one of multiple network controllers executing on various hosts in the data center that together implement the functions of the network control plane in a distributed manner. Network controller 174 may be a computer program that resides and executes in a server in the data center 101, external to data center 101 (e.g., such as in a public cloud) or, alternatively, network controller 174 may run as a virtual appliance (e.g., a VM) in one of hosts 102. Network controller 174 collects and distributes information about the network from and to endpoints in the network. Network controller 174 may communicate with hosts 102 via management network 192, such as through control plane protocols. In certain embodiments, network controller 174 implements a central control plane (CCP) which interacts and cooperates with local control plane components, e.g., agents, running on hosts 102 in conjunction with hypervisors 106.

Network manager 176 is a computer program that executes in a server in networking environment 100, or alternatively, network manager 176 may run in a VM 104, e.g., in one of hosts 102. Network manager 176 communicates with host(s) 102 via management network 192. Network manager 176 may receive network configuration input from a user, such as an administrator, or an automated orchestration platform (not shown) and generate desired state data that specifies logical overlay network configurations. For example, a logical network configuration may define connections between VCIs and logical ports of logical switches. Network manager 176 is configured to receive inputs from an administrator or other entity, e.g., via a web interface or application programming interface (API), and carry out administrative tasks for data center 101, including centralized network management and providing an aggregated system view for a user.

Figure 2:
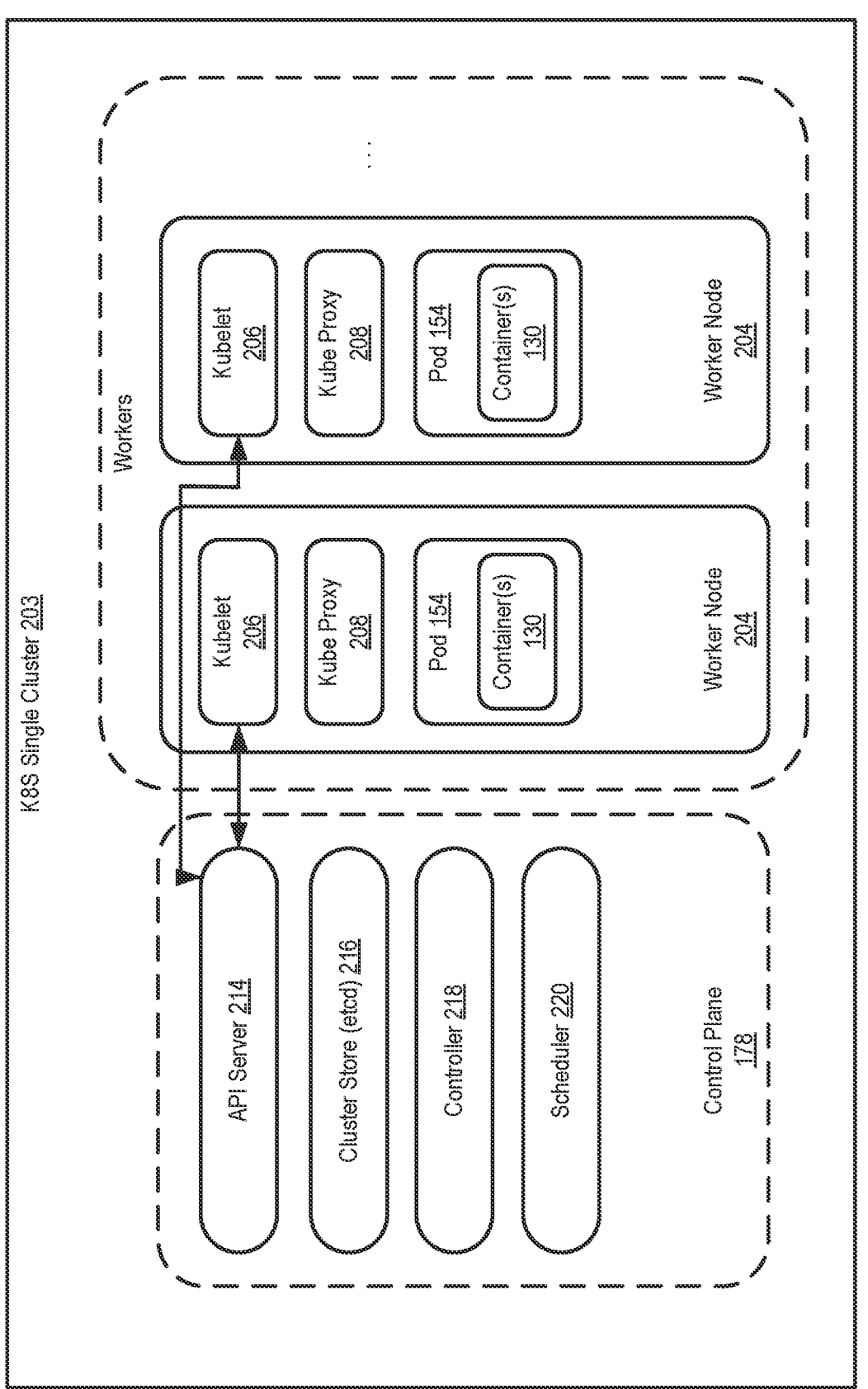
FIG. 2 is a block diagram of an example container-based cluster, according to an example embodiment of the present disclosure.

An example container-based cluster for running containerized workloads is illustrated in FIG. 2. It should be noted that the block diagram of FIG. 2 is a logical representation of a container-based cluster, and does not show where the various components are implemented and run on physical systems. While the example container-based cluster shown in FIG. 2 is a Kubernetes (K8S) cluster 203, in other examples, the container-based cluster may be another type of container-based cluster based on container technology, such as Docker® clusters.

When Kubernetes is used to deploy applications, a cluster, such as K8S cluster 203 illustrated in FIG. 2, is formed from a combination of worker nodes 204 and a control plane 178. Worker nodes 204 may correspond to VMs 104 or hosts 102 of FIG. 1. In certain embodiments, components of control plane 178 run on nodes, such as VMs or physical machines, referred to as control plane nodes. Worker nodes 204 are managed by control plane 178, which manages the computation, storage, and memory resources of worker nodes 204, such as assignment of resources to pods 154. Though pods 154 of containers 130 are shown running on the cluster 203, the pods may not be considered part of the cluster infrastructure, but rather as containerized workloads running on the cluster 203.

Each worker node 204 includes a kubelet 206, which is an agent that ensures that one or more pods 154 run in the worker node 204 according to a defined specification for the pods, such as defined in a workload definition manifest. Each pod 154 may include one or more containers 130. The worker nodes 204 can be used to execute various applications and software processes using container 130. Further each worker node 204 includes a kube proxy 208. Kube proxy 208 is a Kubernetes network proxy that maintains network rules on worker nodes 204. These network rules allow for network communication to pods 154 from network sessions inside and/or outside of K8S cluster 203.

Control plane 178 includes components such as an application programming interface (API) server 214, a cluster store (etcd) 216, a controller 218, and a scheduler 220. Control plane 178's components make global decisions about K8S cluster 203 (e.g., scheduling), as well as detect and respond to cluster events (e.g., starting up a new pod 154 when a workload deployment's replicas field is unsatisfied).

API server 214 operates as a gateway to K8S cluster 203. As such, a command line interface, web user interface, users, and/or services communicate with K8S cluster 203 through API server 214. One example of a Kubernetes API server 214 is kube-apiserver, which is designed to scale horizontally—that is, this component scales by deploying more instances. Several instances of kube-apiserver may be run, and traffic may be balanced between those instances.

Cluster store (etcd) 216 is a data store, such as a consistent and highly-available key value store, used as a backing store for all K8S cluster 203 data.

Controller 218 is a control plane 178 component that runs and manages controller processes in K8S cluster 203. For example, control plane 178 may have (e.g., four) control loops called controller processes, which watch the state of cluster 203 and try to modify the current state of cluster 203 to match an intended state of cluster 203. In certain embodiments, controller processes of controller 218 are configured to monitor external storage for changes to the state of cluster 203.

Scheduler 220 is a control plane 178 component configured to allocate new pods 154 to worker nodes 204. Additionally, scheduler 218 may be configured to distribute resources and/or workloads across worker nodes 204. Resources may refer to processor resources, memory resources, networking resources, and/or the like. Scheduler 218 may watch worker nodes 204 for how well each worker node 204 is handling their workload, and match available resources to the worker nodes 204. Scheduler 218 may then schedule newly created containers 130 to one or more of the worker nodes 204.

In other words, control plane 178 manages and controls every component of the cluster 203. Control plane 178 handles most, if not all, operations within cluster 203, and its components define and control cluster 203's configuration and state data. Control plane 178 configures and runs the deployment, management, and maintenance of the containerized applications.

Figure 3:
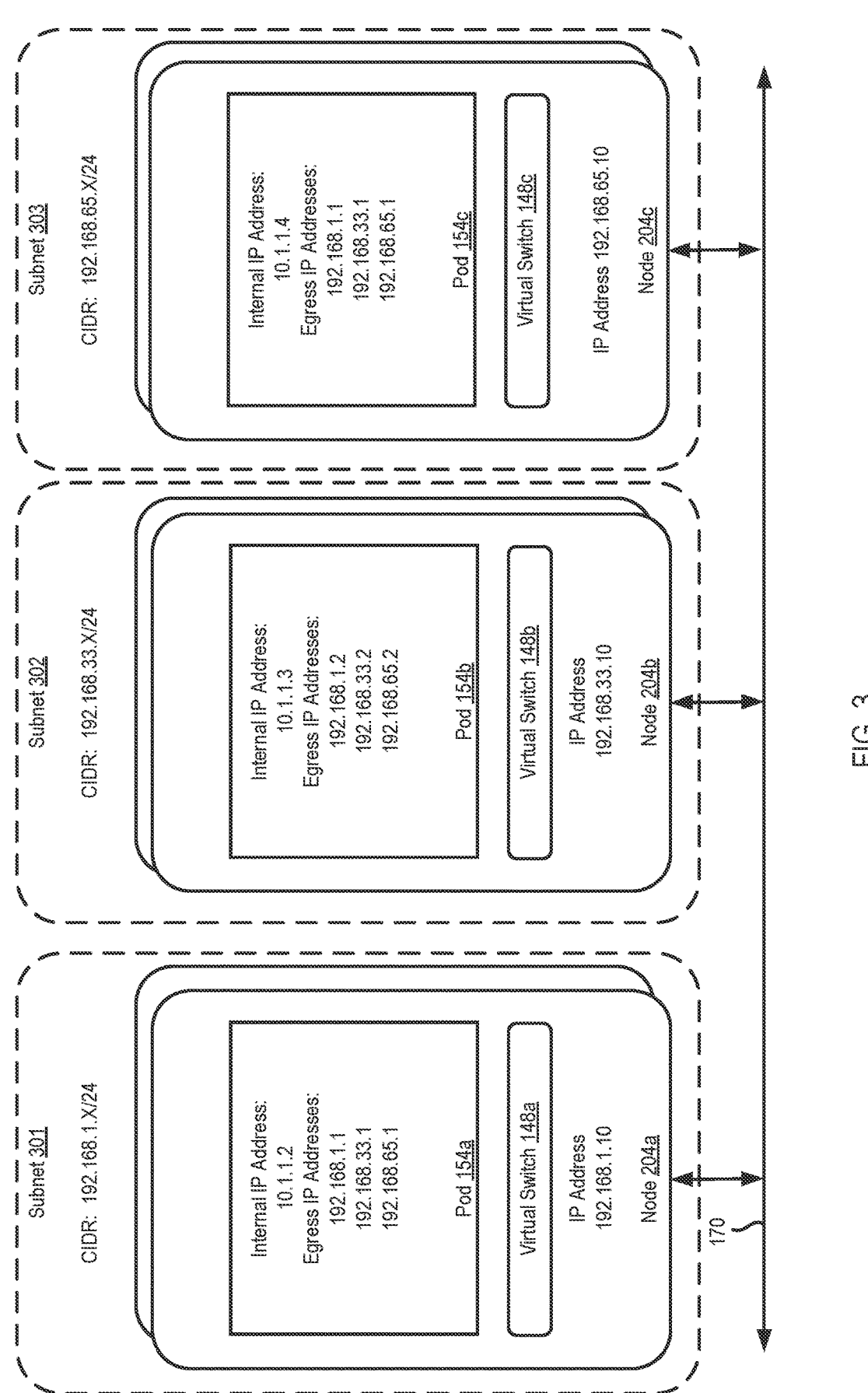
FIG. 3 is a block diagram of an example cluster of nodes in multiple subnets.

FIG. 3 is a block diagram of an example cluster of nodes 204 (e.g., hosts 102 or VMs 104 of FIG. 1) in multiple subnets. The nodes 204 are coupled to network 170, such as according to the connections described with respect to FIG. 1. FIG. 3 illustrates three separate subnets 301-303. Though three subnets are illustrated, nodes 204 of the cluster may be in fewer or a greater number of subnets. Further, there may be one or more nodes 204 of the cluster in each of subnets 301-303.

Nodes 204 in subnet 301 are assigned IP addresses from the CIDR block 192.168.1.X/24. For example, node 204a is assigned IP address 192.168.1.10. Nodes 204 in subnet 302 are assigned IP addresses from the CIDR block 192.168.33.X/24. For example, node 204b is assigned IP address 192.168.33.10. Nodes 204 in subnet 303 are assigned IP addresses from the CIDR block 192.168.65.X/24. For example, node 204c is assigned IP address 192.168.65.10.

Each node 204 includes a virtual switch 148 of FIG. 1. For example, nodes 204a, 204b, and 204c include virtual switches 148a, 148b, and 148c, respectively. Nodes 204a, 204b, and 204c run pods 154a, 154b, and 154c, respectively. Pod 154a is assigned internal IP address 10.1.1.2. Pod 154b is assigned internal IP address 10.1.1.3. Pod 154c is assigned internal IP address 10.1.1.4.

In certain embodiments, the internal IP addresses of pods 154a-154c are not routable on network 170. Accordingly, to enable pods 154 on different nodes 204 to communicate with one another, virtual switches 148 are configured to tunnel packets between nodes using encapsulation. For example, pod 154a may send a packet to pod 154b. The packet may include a header with a source IP address of 10.1.1.2 (i.e., the IP address of pod 154a) and a destination IP address of 10.1.1.3 (i.e., the IP address of pod 154b). The packet from pod 154a is received by virtual switch 148a. Virtual switch 148a determines (e.g., using forwarding tables) that IP address 10.1.1.3 is not reachable on node 204a and is instead reachable on node 204b. Accordingly, virtual switch 148a tunnels the packet to node 204b. In particular, virtual switch 148a encapsulates the packet with an outer header having a source IP address of 192.168.1.10 (i.e., the IP address of node 204a on which virtual switch 148a resides) and a destination IP address of 192.168.33.10 (i.e., the IP address of node 204b on which destination IP address 10.1.1.3 is reachable). The encapsulated packet further includes the original packet along with its header, referred to as an inner header of the encapsulated packet. The encapsulated packet is sent on network 170, which routes the packet to node 204b. Virtual switch 148b at node 204b decapsulates the encapsulated packet, meaning it removes the outer header, to retrieve the inner packet. Virtual switch 148b then sends the packet to pod 154b based on the destination IP address of 10.1.1.3 in the header.

In certain aspects, a virtual switch 148 is also able to perform a gateway function and perform SNAT for egress packets sent from pods 154 within the cluster to destinations outside the cluster. For example, assume node 204b is the egress node for pod 154a. Accordingly, pod 154a may generate an egress packet having a header with a source IP address of 10.1.1.2, and a destination IP address for a destination outside of the cluster. Virtual switch 148a determines (e.g., using forwarding tables) that the packet is an egress packet based on the destination IP address of the packet, and that the node 204b is the egress node for pod 154a. Accordingly, virtual switch 148a tunnels the packet to node 204b. The encapsulated packet has a destination IP address of node 204b as discussed. The encapsulated packet is received at virtual switch 148*b* of node 204*b*, which decapsulates the packet, and performs SNAT on the packet. In an example, the virtual switch 148*b* translates the source IP address from 10.1.1.2 to an egress IP address of the pod 154*a* and then sends the packet out of the cluster.

As discussed, in certain embodiments, multiple egress IP addresses are uniquely allocated to an egress pod set. For example, as shown, pods 154*a* and 154*c* are allocated to a first egress pod set allocated egress IP addresses 192.168.1.1, 192.168.33.1, and 192.168.65.1. Further, pod 154*b* is allocated to a second egress pod set allocated egress IP addresses 192.168.1.2, 192.168.33.2, and 192.168.65.2. In the example, each egress pod set is allocated an egress IP address for each subnet 301-303 of the cluster. However, it should be noted that an egress pod set may only be allocated egress IP addresses for a subset of the subnets of the cluster in some embodiments.

Figure 4:
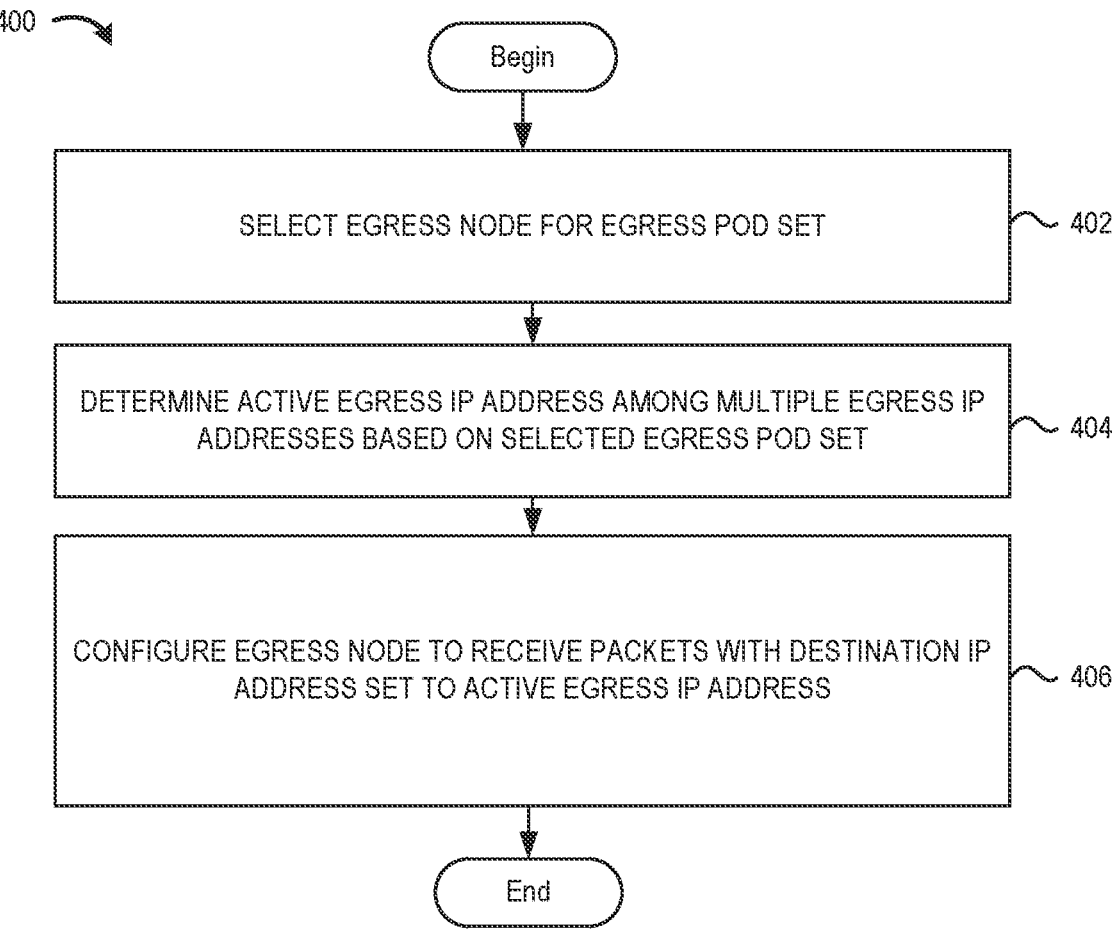
FIG. 4 shows a flow diagram depicting a method for configuring an egress node for an egress pod set.

FIG. 4 shows a flow diagram depicting a method 400 for configuring an egress node for an egress pod set. In an example, an egress node is selected for a first egress pod set including pod 154*a* and pod 154*c* as shown in FIG. 3. An example of method 400 is described with respect to FIG. 3.

At 402, an egress node is selected for an egress pod set. The egress node is selected among nodes (e.g., all nodes) in the same cluster as the pod(s) of the egress pod set.

In certain embodiments, the egress node is selected randomly among all available nodes in the cluster. In certain embodiments, the egress node is selected using some load balancing technique, such as round robin, among all available nodes in the cluster. For example, a controller (e.g., controller 218 of FIG. 2 is configured to select the egress node. Available nodes may be nodes in a healthy state that are operational and reachable via the underlay network of the cluster, as contrasted to unavailable nodes which may be powered off, non-functional, have a network failure, etc.

In certain embodiments, availability of a node is further based on a number of egress pod sets for which the node is an egress node. For example, there may be a threshold egress node number, whereby a node is considered unavailable once it is configured as an egress node for the threshold egress node number. For example, where the threshold egress node number is 3, and a node is configured as an egress node for less than three egress pod sets, the node is still considered available. Where the threshold egress node number is 3, and the node is configured as an egress node for three egress pod sets, the node is considered unavailable.

In certain embodiments, the nodes of the cluster perform a leader election to select the egress node. The multiple egress IP addresses associated with an egress pod set may be ordered in order of preference, such as determined by an administrator. For example, for the first egress pod set, the order is 1) 192.168.1.1, 2) 192.168.33.1, and 3) 192.168.65.1. In certain embodiments, an egress node is selected for the egress pod set based on the order of preference of the multiple egress IP addresses allocated to the egress node pod set. In particular, it is determined (e.g., by a controller such as controller 218) whether there are any available nodes in the cluster in the same subnet as the first egress IP address in order of preference. In the example of the first egress pod set, it is determined if there are any available nodes in the subnet 301 (CIDR block: 192.168.1.X/24) based on the first egress IP address 192.168.1.1 being in the CIDR block of subnet 301.

If there are one or more available nodes in the same subnet as the first egress IP address in order of preference, one of the one or more available nodes is selected (e.g., randomly, using round-robin, based on load balancing, etc.)

as the egress node, such as by the controller. Further, the first egress IP address is set as the active egress IP address of the egress pod set, such as by the controller.

If there are not one or more available nodes in the same subnet as the first egress IP address in order of preference, it is determined, such as by the controller, whether there are any available nodes in the cluster in the same subnet as the second egress IP address in order of preference. Accordingly, it is determined if there are one or more available nodes in the same subnet as the second egress IP address in order of preference for selection as the egress node, such as by the controller. Thus, subnets may be sequentially checked for an available node until an available node is found to configure as the egress node for the egress pod set based on the order of the multiple egress IP addresses of the egress pod set.

In an example, node 204*b* is selected as the egress node for the first egress pod set.

At 404, the active egress IP address among the multiple egress IP addresses associated with the egress pod set is determined based on the selected egress node. For example, the active egress IP address is the one of the multiple egress IP addresses that is in a same subnet as the selected egress node. In an example, selected node 204*b* has an IP address of 192.168.33.10, which is in subnet 302 having CIDR block 192.168.33.X/24. Egress IP address 192.168.33.1 is in CIDR block 192.168.33.X/24, and therefore is the determined active egress IP address for the first egress pod set.

At 406, the selected egress node is configured to receive packets with a destination IP address set to the determined active egress IP address for the egress pod set. For example, router(s) of network 170 are configured to route traffic destined for egress IP address 192.168.33.1 to node 204*b*.

In certain embodiments, the egress node advertises the determined active egress IP address via address resolution protocol (ARP) or neighbor discover protocol (NDP) and responds to ARP/NDP queries for the active egress IP address. For example, node 204*b* advertises its association with egress IP address 192.168.33.1 in subnet 302, such that traffic destined for egress IP address 192.168.33.1 is routed to node 204*b* in subnet 302.

In certain embodiments, such as in cloud environments where ARP/NDP are not allowed, the active egress IP address may be programmatically configured as a secondary IP address of the egress node. For example, node 204*b* may be associated with IP address 192.168.33.10 and IP address 192.168.33.1.

In certain embodiments, to inform a user of the active egress IP address and egress node for the egress pod set, such information may be reported to a user via control plane 178, such as via API server 214.

Accordingly, method 400 configures an egress node for an egress pod set. Egress packets from the egress pod set can then be encapsulated with the destination IP address of the encapsulated packet set as the active egress IP address of the egress pod set. Accordingly, the encapsulated packet is routed to the egress node. Further, the virtual switch on the egress node uses the destination IP address in the encapsulated packet to perform SNAT. In particular, the virtual switch decapsulates the encapsulated packet and translates the source IP address of the original packet to the destination IP address of the encapsulated packet, thereby making the original packet routable in the same subnet as the egress node.

Continuing the example, virtual switch 148*b* of node 204*b* is configured to perform SNAT for pod 154*a*. In particular, pod 154*a* generates an egress packet having a header with a source IP address of 10.1.1.2, and a destination IP address for a destination outside of the cluster. Virtual switch 148*a* determines (e.g., using forwarding tables) that the packet is an egress packet based on the destination IP address of the packet, and that the node 204*b* is the egress node for pod 154*a*. Accordingly, virtual switch 148*a* tunnels the packet to node 204*b*. The encapsulated packet has a destination IP address set as the active egress IP address 192.168.33.1 associated with node 204*b* as discussed. The encapsulated packet is received at virtual switch 148*b* of node 204*b*, which decapsulates the packet, and performs SNAT on the packet. In an example, the virtual switch 148*b* translates the source IP address from 10.1.1.2 to the destination IP address of the encapsulated packet, 192.168.33.1, which is the active egress IP address of the pod 154*a* and then sends the packet out of the cluster.

Figure 5:
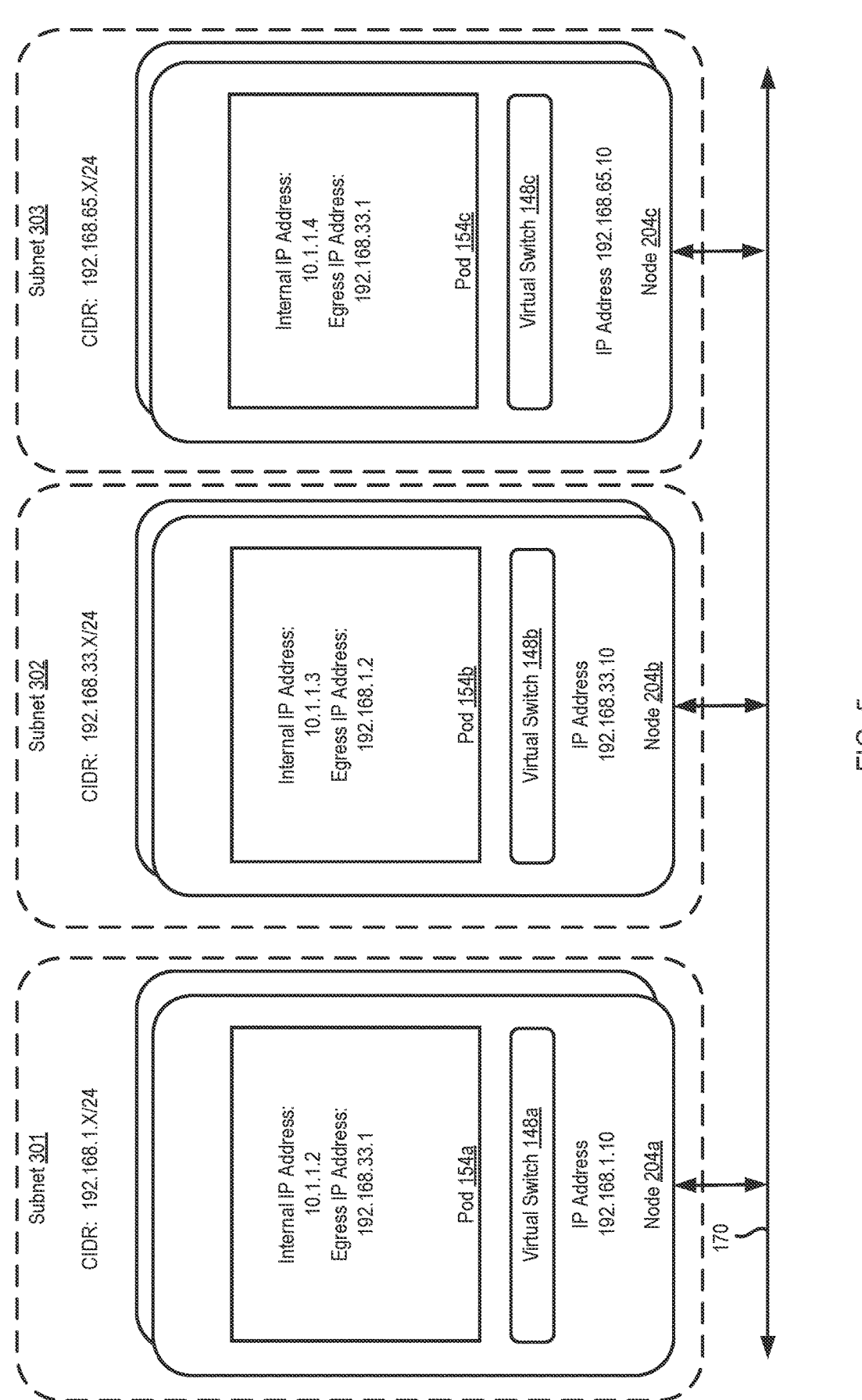
FIG. 5 is a block diagram of an example cluster of nodes in multiple subnets.

FIG. 5 is a block diagram of an example cluster of nodes 204 (e.g., hosts 102 or VMs 104 of FIG. 1) in multiple subnets. FIG. 5 is the same as FIG. 3, except that each egress pod set is allocated only a single egress IP address as shown. For example, as shown, pods 154*a* and 154*c* are allocated to a first egress pod set allocated egress IP address 192.168.33.1. Further, pod 154*b* is allocated to a second egress pod set allocated egress IP address 192.168.1.2.

Figure 6:
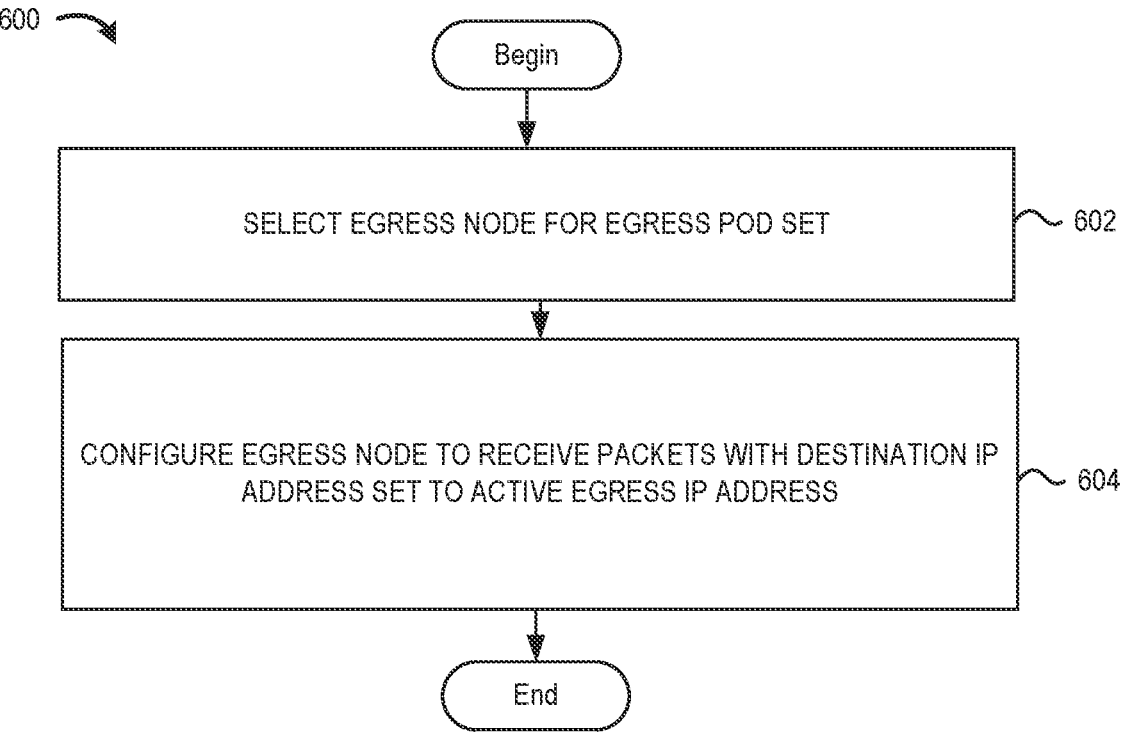
FIG. 6 shows a flow diagram depicting a method for configuring an egress node for an egress pod set.

FIG. 6 shows a flow diagram depicting a method 600 for configuring an egress node for an egress pod set. In an example, an egress node is selected for a first egress pod set including pod 154*a* and pod 154*c* as shown in FIG. 5. An example of method 600 is described with respect to FIG. 5.

At 602, an egress node is selected for an egress pod set. The egress node is selected among nodes (e.g., all nodes) in the same cluster as the pod(s) of the egress pod set.

In certain embodiments, the egress node is selected randomly among all available nodes in the cluster. In certain embodiments, the egress node is selected using some load balancing technique, such as round robin, among all available nodes in the cluster. For example, a controller (e.g., controller 218 of FIG. 2 is configured to select the egress node.

In certain embodiments, the node in the cluster selected as the egress node for the egress pod set is in a different subnet than the single egress IP address allocated to the egress pod set. For example, node 204*a* may be selected as the egress node for the first egress pod set allocated the egress IP address 192.168.33.1. Node 204*a* is in subnet 301, and has IP address 192.168.1.10 in CIDR block 192.168.1.X/24 of subnet 301. Notably, egress IP address 192.168.33.1 is not in the CIDR block 192.168.1.X/24 of subnet 301 of node 204*a*.

At 604, the selected egress node is configured to receive packets with a destination IP address set to the single egress IP address for the egress pod set. For example, router(s) of network 170 are configured to route traffic destined for egress IP address 192.168.33.1 to node 204*a* in subnet 301, even though egress IP address 192.168.33.1 is not in the CIDR block of subnet 301. In particular, a static route for the single egress IP address is configured at router(s) of network 170 to route traffic destined for the single egress IP address to the selected egress node. In certain embodiments, the router is programmatically configured with the static route, such as in a cloud environment. In certain embodiments, the router is configured with the static route via a routing protocol, such as border gateway protocol (BGP). The method 600, unlike method 400, may require the underlay network (e.g., network 170) to support route configuration or dynamic routing protocols, and therefore may not work in some platforms.

In certain embodiments, to inform a user of the egress node for the egress pod set, such information may be reported to a user via control plane 178, such as via API server 214.

Accordingly, method 600 configures an egress node for an egress pod set. Egress packets from the egress pod set can then be encapsulated with the destination IP address of the encapsulated packet set as the active egress IP address of the egress pod set. Accordingly, the encapsulated packet is routed to the egress node. Further, the virtual switch on the egress node uses the destination IP address in the encapsulated packet to perform SNAT. In particular, the virtual switch decapsulates the encapsulated packet and translates the source IP address of the original packet to the destination IP address of the encapsulated packet, thereby making the original packet routable in the same subnet as the egress node.

Continuing the example, virtual switch 148*a* of node 204*a* is configured to perform SNAT for pod 154*c*. In particular, pod 154*c* generates an egress packet having a header with a source IP address of 10.1.1.4, and a destination IP address for a destination outside of the cluster. Virtual switch 148*c* determines (e.g., using forwarding tables) that the packet is an egress packet based on the destination IP address of the packet, and that the node 204*a* is the egress node for pod 154*c*. Accordingly, virtual switch 148*c* tunnels the packet to node 204*a*. The encapsulated packet has a destination IP address set as the active egress IP address 192.168.33.1 associated with node 204*a* as discussed. The encapsulated packet is received at virtual switch 148*a* of node 204*a*, which decapsulates the packet, and performs SNAT on the packet. In an example, the virtual switch 148*a* translates the source IP address from 10.1.1.4 to the destination IP address of the encapsulated packet, 192.168.33.1, which is the active egress IP address of the pod 154*c* and then sends the packet out of the cluster.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in example configurations may be implemented as a combined structure or component. Similarly, structures and functionality presented as a single component may be implemented as separate components. These and other variations, modifications, additions, and improvements may fall within the scope of the appended claim(s).

We claim:

1. A method for configuring an egress node for an egress pod set comprising one or more pods, the method comprising:

selecting a node of a cluster of nodes to act as the egress node for the egress pod set, wherein the egress pod set is allocated a plurality of egress internet protocol (IP) addresses;

determining an egress IP address of the plurality of egress IP addresses to be an active egress IP address of the egress pod set based on an IP address of the egress node;

configuring the egress node to receive packets with a destination IP address set to the active egress IP address;

receiving, at the egress node, an encapsulated packet comprising:

an outer header including a destination IP address set as the active egress IP address, and or more pods;

an inner header including a source IP address set as an IP address of one of the one of the one or more pods;

decapsulating the encapsulated packet to generate a packet with a header that is the inner header; and translating the source IP address of the header of the packet by setting the source IP address as the active egress IP address.

2. The method of claim 1, wherein the cluster of nodes are located in a plurality of subnets, and wherein each of the plurality of egress IP addresses is associated with a different subnet of the plurality of subnets.

3. The method of claim 2, wherein the plurality of egress IP addresses are ordered in order of preference, and wherein selecting the node comprises selecting the node based on a subnet of the node, subnets of the plurality of egress IP addresses, and the order of preference of the plurality of egress IP addresses.

4. The method of claim 1, wherein selecting the node comprises selecting the node based on a number of egress pod sets associated with the node.

5. The method of claim 1, wherein configuring the egress node comprises the egress node advertising the active egress IP address as associated with the egress node via address resolution protocol (ARP) or neighbor discover protocol (NDP).

6. The method of claim 1, wherein configuring the egress node comprises configuring the active egress IP address as a secondary IP address of the egress node.

7. The method of claim 1, further comprising applying a firewall policy to the packet based on the source IP address.

8. One or more non-transitory computer readable media comprising instructions that, when executed by one or more processors of a computing system, cause the computing system to perform operations for configuring an egress node for an egress pod set comprising one or more pods, the operations comprising:

selecting a node of a cluster of nodes to act as the egress node for the egress pod set, wherein the egress pod set is allocated a plurality of egress internet protocol (IP) addresses;

determining an egress IP address of the plurality of egress IP addresses to be an active egress IP address of the egress pod set based on an IP address of the egress node;

configuring the egress node to receive packets with a destination IP address set to the active egress IP address;

receiving, at the egress node, an encapsulated packet comprising:

an outer header including a destination IP address set as the active egress IP address, and or more pods;

an inner header including a source IP address set as an IP address of one of the one of the one or more pods;

decapsulating the encapsulated packet to generate a packet with a header that is the inner header; and translating the source IP address of the header of the packet by setting the source IP address as the active egress IP address.

9. The one or more non-transitory computer readable media of claim 8, wherein the cluster of nodes are located in a plurality of subnets, and wherein each of the plurality of egress IP addresses is associated with a different subnet of the plurality of subnets.

10. The one or more non-transitory computer readable media of claim 9, wherein the plurality of egress IP addresses are ordered in order of preference, and wherein selecting the node comprises selecting the node based on a subnet of the node, subnets of the plurality of egress IP addresses, and the order of preference of the plurality of egress IP addresses.

11. The one or more non-transitory computer readable media of claim 8, wherein selecting the node comprises selecting the node based on a number of egress pod sets associated with the node.

12. The one or more non-transitory computer readable media of claim 8, wherein configuring the egress node comprises the egress node advertising the active egress IP address as associated with the egress node via address resolution protocol (ARP) or neighbor discover protocol (NDP).

13. The one or more non-transitory computer readable media of claim 8, wherein configuring the egress node comprises configuring the active egress IP address as a secondary IP address of the egress node.

14. A computer system, the computer system comprising:

one or more memories; and one or more processors, the one or more processors being configured to perform operations for configuring an egress node for an egress pod set comprising one or more pods, the operations comprising:

selecting a node of a cluster of nodes to act as the egress node for the egress pod set, wherein the egress pod set is allocated a plurality of egress internet protocol (IP) addresses;

determining an egress IP address of the plurality of egress IP addresses to be an active egress IP address of the egress pod set based on an IP address of the egress node;

configuring the egress node to receive packets with a destination IP address set to the active egress IP address;

receiving, at the egress node, an encapsulated packet comprising:

an outer header including a destination IP address set as the active egress IP address, and or more pods;

an inner header including a source IP address set as an IP address of one of the one of the one or more pods;

decapsulating the encapsulated packet to generate a packet with a header that is the inner header; and translating the source IP address of the header of the packet by setting the source IP address as the active egress IP address.

15. The computer system of claim 14, wherein the cluster of nodes are located in a plurality of subnets, and wherein each of the plurality of egress IP addresses is associated with a different subnet of the plurality of subnets.

16. The computer system of claim 15, wherein the plurality of egress IP addresses are ordered in order of preference, and wherein selecting the node comprises selecting the node based on a subnet of the node, subnets of the plurality of egress IP addresses, and the order of preference of the plurality of egress IP addresses.

17. The computer system of claim 14, wherein selecting the node comprises selecting the node based on a number of egress pod sets associated with the node.

18. The computer system of claim 14, wherein configuring the egress node comprises the egress node advertising the active egress IP address as associated with the egress node via address resolution protocol (ARP) or neighbor discover protocol (NDP).

19. The computer system of claim 14, wherein configuring the egress node comprises configuring the active egress IP address as a secondary IP address of the egress node.

20. The one or more non-transitory computer readable media of claim 8, wherein the operations further comprise applying a firewall policy to the packet based on the source IP address.

* * * * *